July 19, 1960 H. C. SWIFT ET AL 2,945,691
WINDOW LIFT MECHANISM
Filed May 14, 1956 6 Sheets-Sheet 3

INVENTORS
HARVEY C. SWIFT
BY CECIL M. PETER
Whittemore, Hulbert
Belknap ATTORNEYS July 19, 1960

H. C. SWIFT ET AL

2,945,691

WINDOW LIFT MECHANISM

Filed May 14, 1956

INVENTORS
HARVEY C. SWIFT
CECIL M. PETER
BY
ATTORNEY

July 19, 1960   H. C. SWIFT ET AL   2,945,691
WINDOW LIFT MECHANISM
Filed May 14, 1956   6 Sheets-Sheet 5

INVENTORS
HARVEY C. SWIFT
BY CECIL M. PETER
ATTORNEYS

United States Patent Office 2,945,691
Patented July 19, 1960

2,945,691
WINDOW LIFT MECHANISM

Harvey C. Swift, 875 Stanley, Birmingham, Mich., and Cecil M. Peter, 1036 Bishop Road, Grosse Pointe, Mich.

Filed May 14, 1956, Ser. No. 584,557

15 Claims. (Cl. 268—124)

The present invention relates to improvements in window lift mechanism, and particularly to a power driven mechanism for moving a vehicle window into and out of a hollow frame, of the general type illustrated and described in our co-pending application, Serial No. 374,242, filed August 14, 1953, now abandoned, although the adaptability of the improved mechanism is by no means limited to an installation of this sort. Therefore, it is to be understood that, though the principles of the invention are illustrated and described herein in various embodiments in a window regulator or lift including a vertically movable window panel, the invention also has practical application to other regulator or operating mechanisms involving other components and directions of movement. An installation in a dwelling or other building is an example.

It is a general object of the invention to provide a mechanism of the above sort characterized by a nut and screw operator, preferably a screw and ball nut of the captive ball type associated with the screw, in which one of the nut and screw elements is rotatable and the other of the elements is held against rotation and in which, furthermore, one of these elements is bodily movable and the other of the elements is held against such movement.

More particularly, it is an object of the invention to provide a mechanism of the sort described driven by an electric motor or other suitable prime mover and provided with a dynamic stabilizer or inertia or flywheel device to eliminate or greatly minimize the noise which otherwise attends the working of power driven regulator mechanism of the character under consideration.

Another object is to provide a window regulator or like mechanism of the rotating screw and ball nut type, preferably driven by a small electric motor through a flexible or resilient coupling of the sort referred to, in which the weight of the window is in the main borne and balanced by two constant force springs of the coiled tape, negator type. Load is thus taken from the rotating screw, enabling a smaller motor to be employed; further, the point of application of the regulating force of the nut and screw mechanism may be chosen as desired along the length of the window.

A more specific object of the invention is to provide a window regulating mechanism controlled through a flexible inertia coupling, as described, in which the coupling may be a simple elastic core or disk non-rotatably receiving the driving and driven parts, with a metal inertia or fly-wheel ring, disk or the like, bonded to the elastic part. An inertia component as thus employed eliminates noise of operation found to exist in similar units driven through an elastic coupling but lacking the inertia provision, for reasons hereinafter set out in detail.

In certain embodiments of the invention, it is an object to provide an inertia coupled regulator of the sort referred to above, in which the resilient inertia element is a bonnet-like element connected to a coupling part so as to serve as a hood or shield to protect a subjacent motor against water or accumulated foreign material.

Another specific object of the invention is to provide improved means for the rotative top and bottom mounting of a helical screw member with which a traveling window operating nut is associated. In accordance with one form, simple stamped bushing receiving parts are bonded to an elastic cushion or wafer and, as thus produced, they rotatively receive the screw member and are assembled to a supporting rail or frame in a very expeditious way. The elastic material is in tension or torsional stress under the torsion of the rotating screw, and also may cushion the nut at its top and bottom limits. In accordance with a further form, a special supporting block is provided which has opposed screw elements imbedded therein in the moulding thereof, to engage a journalling support.

Still another object is to provide a regulator as described which has an improved elastic cushion connection between its traveling element (usually a ball nut) and the window controlled thereby. In accordance with another aspect of the invention, it is an object to provide an improved hollow tubular screw element for a captive ball type nut which is associated therewith, by which improvement the over-all cost of the installation is greatly reduced.

Yet another object of the invention is to provide an improved method for forming a screw element as referred to by a thread rolling operation.

Other objects and features of the invention will become apparent as the description proceeds, especially when taken in conjunction with the accompanying drawings, wherein:

The requirements for a satisfactory power window lift mechanism for raising and lowering the windows of vehicles, such for example as automobiles, are not met to the fullest extent by currently used installations. In the first place, it is recognized that the most suitable motive power for the purpose may be supplied by an electric motor, thereby avoiding the many difficulties inherent in systems employing hydraulic units. In order to employ electric motors economically and satisfactorily it is necessary to devise mechanism taking the fullest advantage of the power available so that individual electric motors of the smallest possible size and cost may be employed.

In accordance with the present invention a nut and screw combination, and more particularly a ball nut of the captive ball type in association with a screw is employed. This permits a direct connection between the movable element of the nut and screw combination to the window, thereby avoiding loss of power inherent in less directly acting systems. The ball nut and screw combination operates at a high rate of efficiency and a sufficient lead may be provided on the screw so as to effect sufficiently rapid vertical movement of the window without requiring relative rotation between the nut and screw at excessive speeds. By a proper selection of motor, screw, and nut, it will be possible to obtain the desired rate of operation while employing direct connection between the motor and the rotatable one of the screw and nut elements. It is within the contemplation of the present invention to provide means protecting the screw and nut device, as well as its operating motor, from the accumulation or deposition of foreign matter such as dirt, dust, water, ice or solvent, without interfering with the efficient operation thereof.

From practical standpoints, lessened cost of production and improved quietness of operation, the improvements here illustrated provide for the manufacture of the screw element for the nut and screw operator combination in a way to substantially decrease the cost of the mechanism as a whole, a result which is also contributed to by other structural simplifications; and the noise factor is eliminated by the provision of a flexible coupling which, while permitting the operating motor to reach speed before undertaking its full load, also compensates out the vibratory effect which has in the past given rise to objectionable noise in operation.

Figures 1, 2, 3:
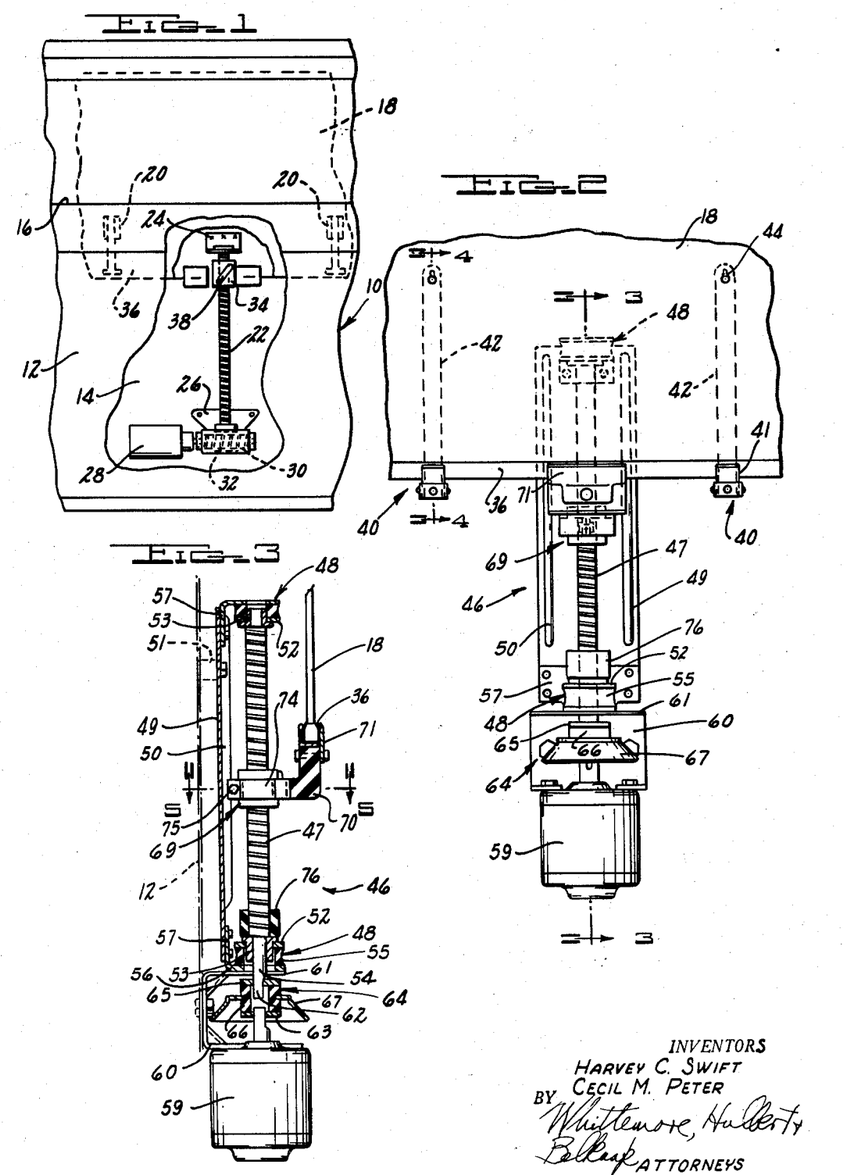
Fig. 1 is a fragmentary elevational view of a vehicle door having a window regulating mechanism in accordance with the invention, parts being broken away.
Fig. 2 is a fragmentary view in elevation of a window regulating mechanism in accordance with a further modification of the invention.
Fig. 3 is a fragmentary view in vertical section along line 3—3 of Fig. 2.
Figure 4:
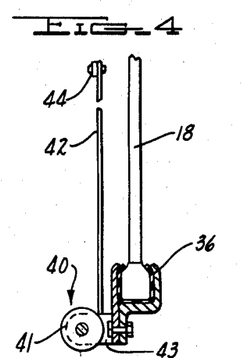
Fig. 4 is a fragmentary view in vertical section along line 4—4 of Fig. 2.

Referring now to the drawings, in Figure 1, there is illustrated a simple form of the present invention in which a frame part, such for example as an automobile door 10 includes a hollow frame part 12 having substantial open space therein as indicated at 14. The door includes a window opening 16 adapted to be selectively closed by a vertically movable window 18 guided for vertical move-ment in suitable guides at the sides thereof as is conventional in the art.

In order to reduce the power of the motor required to raise and lower the window it is contemplated that in all embodiments of the present invention the weight of the window may be effectively counterbalanced by suitable mechanism such for example as springs indicated at 20 herein. These springs, merely by way of example, may be of the constant load coil type readily available on the open market, and effective to provide a substantially constant upward force selected to counterbalance the weight of the window. Accordingly, the only force required by the window regulating mechanism in raising and lowering the window is that required to overcome the friction of the moving parts. It will be understood that the counterbalance mechanism illustrated in Figure 1 is preferably employed in all modifications of the invention but it is not again illustrated or described to avoid unnecessary repetition. Further reference to the function of springs 20 will be made later.

The mechanism for raising and lowering the window 18, in the embodiment of the invention illustrated in Figure 1, comprises a screw 22 mounted for rotation in suitable bearings carried by brackets 24 and 26, these bearings supporting the screw 22 against vertical endwise or axial movement. Means are provided for effecting rotation of the screw 22 and this means is herein illustrated as an electric motor 28 including a driving worm 30 meshing with a worm gear 32 secured to the lower end of the screw 22.

Mounted on the screw 22 is a low friction captive ball type nut or ball nut 34 which is directly connected to the lower element 36 of the window frame so that the nut 34 and window 18 have equal vertical movement. The frame element 36 effectively prevents rotation of the ball nut 34 and hence, rotation of the screw results in vertical movement of the nut and corresponding equal vertical movement of the window 18.

Details of a typical ball nut and screw combination suitable for use in conjunction with the improved mechanism are well-known in the art. It suffices to state that the ball nut 34 has a bore therethrough carrying a continuous helical groove, and that the screw 22 is received in this bore with free clearance. A ball return tube 38 is carried by the ball nut 34, communicating at opposite ends of the tube with the helical formation internally thereof, and a plurality of balls are supplied in the helical formation and ball return tube 38 to transmit forces between nut 34 and screw 22 in their relative rotation and relative axial travel. A variety of specifically different ball nuts are on the market today and any of these are suitable for use in the present window lift mechanism.

A further very practical and economical embodiment of the invention is illustrated in Figs. 2–5 of the drawings. As there illustrated, the bottom bar 36 of the window 18 has applied thereto a pair of constant force spring compensator units 40 of known type, each comprising a coil 41 (Fig. 4) of steel tape 42 journaled on the coil axis between brackets 43 affixed to bar 36 of window 18. The uppermost end of each tape 42 is appropriately anchored at 44 on the door or other suitable frame part, within the window opening 16 (Fig. 1) of the latter. These counterbalance units exert a distributed lift at the lower edge of the window to offset the weight of the window, so that the only force required to be performed in raising and lowering (or closing and opening) the window is that to overcome the fraction of the moving parts, as in the case of the spring units 20 of Fig. 1. In the present instance, the spring lift derives from the torque at the tape coil 41 as the tape 42 inherently tends to return to coil form.

In accordance with the embodiment of Figs. 2–5, the regulating mechanism thereof, generally designated 46, includes a vertically extending rotatable screw 47, which may be of the improved tubular type illustrated in Figs. 17–22, and this screw is rotatably supported at its upper and lower ends in journals or bearings 48 of an improved and simplified type. As best illustrated in Fig. 3, a mounting plate 49 of vertically elongated shape is provided, being stiffened by parallel ribbed formations 50, which mounting plate is rigidly fastened to the door member or frame part 12, as by means of a spacer collar and bolt connection 51. Each of the journal or bearing units 48 may comprise a centrally apertured circular stamping 52 which non-rotatively receives an appropriate bushing 53 in which the lower rod-like end 54 rotates, and a cushioning disc or wafer 55 is received between the stamping 52 and the horizontal flange 56 of a bracket 57 which is welded or otherwise secured to the mounting plate 49 at the lower end of the latter.

The bracket flange 56 is provided with an enlarged opening in axial alignment with the openings in stamping 52 and cushioning wafer 55, and these parts are preferably bonded together in the moulding of the rubber component so as to constitute a simply and inexpensively produced bearing unit 48. The upper unit 48 is of like construction, rotatively receiving an upper, rod-like extremity of the operating screw 17.

The electric operating motor 59 of the mechanism 46 is supported on a horizontal flange of a reinforced U-shaped bracket 60 which is rigidly secured to the mounting plate 49, the lowermost bearing unit 48 being in directly superposed relation to an apertured upper flange 61 of the bracket 60. The motor has its drive shaft provided with a D-shaped driving formation 62 which is non-rotatably received in an aperture of similar outline in a lower rigid plate or washer 63 of a resilient coupling 64. A rigid upper plate or washer 65 of the coupling 64 similarly receives the lower shaped driven end of the screw 47.

As illustrated in Figs. 2 and 3, coupling 64 includes a resilient rubber sleeve 66 bonded between the lower and upper washers 63, 65 to constitute the coupling. In accordance with the invention, these parts also have moulded therewith an annular, bonnet-like hood and counterweight element 67 which flares downwardly and outwardly so as to furnish a shield for the motor shaft and motor, while at the same time acting as a compensating counterweight. We have found that this compensation effectively overcomes the noise attending operation of similar previous mechanisms, as will be explained.

Figure 5:
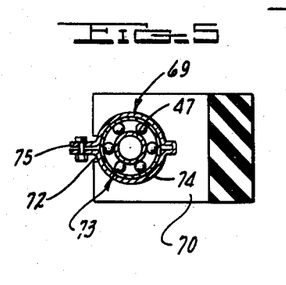
Fig. 5 is a fragmentary view in horizontal section along line 5—5 of Fig. 3.

A ball nut unit 69 is associated with the screw 47, being held against rotation by its mechanical connection to the bottom bar of window 18. As illustrated in Figs. 2, 3 and 5, the window mounting is a cushioned one comprising an L-shaped block 70 of rubber or synthetic rubber in a relatively thick section having its legs disposed vertically and horizontally. The upstanding horizontal leg receives a clamp 71 to grip firmly the cross bar 36 of window 18; while the horizontal leg is split at 72 (Fig. 5) and is provided with an enlarged, generally circular opening 73 in which a hose clamp type of connector 74 is moulded. This connector is taken up by a screw 75 in a conventional manner to grip the periphery of the ball nut 69 and thus establish a rigid fixed connection between the ball nut, the connector member 70 of non-metallic material and the window 18. If desired, appropriate sleeve-like bumpers 76 may surround the screw 47 adjacent its top and bottom to act as stop cushions for ball nut 69 in its upper and lower positions.

Figure 6:
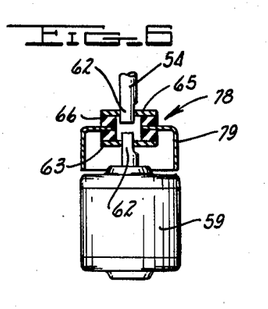
Fig. 6 is a fragmentary view in section similar to Fig. 3, showing a modified embodiment of the resilient flywheel coupling of the mechanism.

A slightly modified adaptation of a portion of the structure of Figs. 2 and 3 is illustrated in Fig. 6 of the drawings; in accordance with this modification, the resilient coupling-fly wheel element, specially designated 78, is provided with an annular skirt-like hood 79 which is abruptly downturned and is of a sufficient axial extent to terminate very close to the upper extremity of the operating motor. This enhances the shield for the motor parts, and the fly wheel effect is the same as that described in reference to Figs. 2–5. Other parts appearing in Fig. 6 which correspond to those illustrated in Figs. 2–5 are, for the sake of simplicity, designated by corresponding reference numerals.

Figure 7:
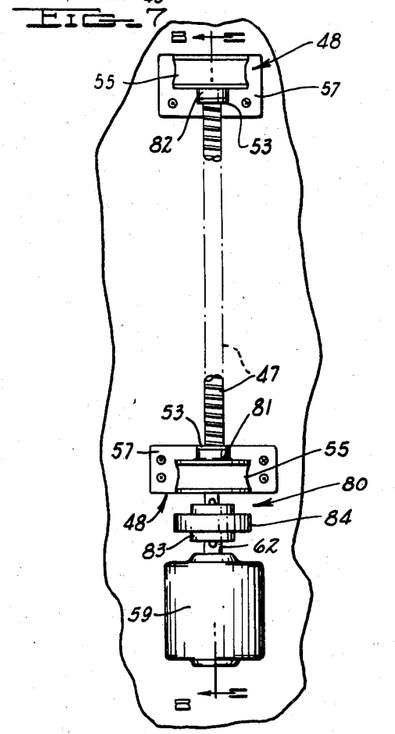
Fig. 7 is a fragmentary view in elevation of a window regulating mechanism in yet another modified embodiment.
Figure 8:
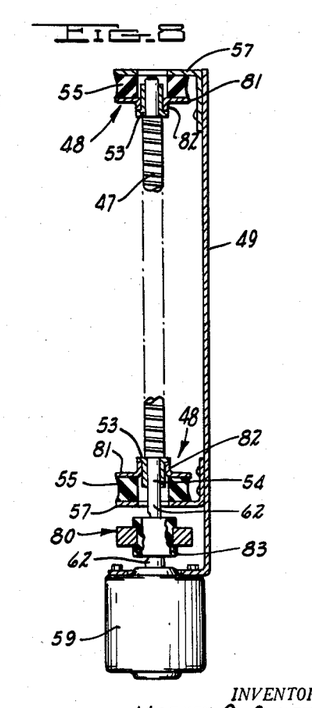
Fig. 8 is a view in vertical section along line 8—8 of Fig. 7.

A further modification of the invention is illustrated in Figs. 7 and 8, differing primarily from the form of Figs. 2–5 in respect to the combined resilient torque coupling and flywheel units, which is generally designated 80 in Figs. 7 and 8. For the sake of simplicity, a representation of the ball nut unit and its connections to the window have been omitted, and parts corresponding to those shown in Figs. 2–5 are designated by corresponding reference numerals. It will be noted that, in accordance with the form of Figs. 7 and 8, the resilient rubber wafers 55 of the upper and lower bearing units 48 for screw 47 are bonded to annular washers 81 of grommet-like sectional outline, which are axially flanged inwardly at 82 to engage the flanges of the screw-receiving bushings 53.

In accordance with Figs. 7 and 8, the coupling 80 takes the form of a sleeve 83 of rubber or like material, the bore of which is of non-circular, D-shaped outline to receive the drive shaft 62 of motor 59 and the driven shaft extension 54 of screw 47, as described above in reference to the washers 63, 65 of Fig. 3. The torque transmitting sleeve 83 is narrowed at its waist to receive fly-wheel ring 84, preferably bonded thereto to constitute the combined unit 80. The compensating action of this fly-wheel element has the effect of eliminating operational noise, as described above.

Figures 9, 10, 11:
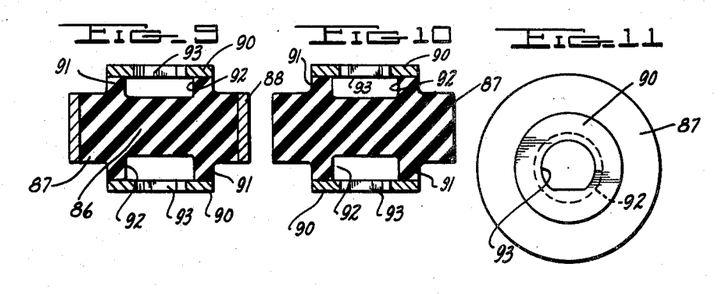
Figs. 9 and 10 are views in vertical section, similar to Fig. 8, showing further modification of a combined resilient coupling-fly-wheel unit as contemplated for use in the mechanism.
Fig. 11 is a plan view of the unit shown in Fig. 10.

Alternatively available, modified adaptations of combined resilient coupling-fly-wheel units are illustrated in Fig. 9, and in Figs. 10 and 11. In accordance with the form appearing in Fig. 9, the rubber cushioning element 86 is moulded to provide an annular, radially extending flange 87 of substantial bulk and axial thickness, which flange has bonded thereto an encircling fly-wheel ring 88 of metal. By preference, metal washers 90 are moulded on opposed axial bosses 91 of the element 86, these washers having non-circular apertures to receive drive shaft and driven screw parts, the bosses 91 being recessed at 92 to accommodate those parts.

The modified form illustrated in Figs. 10 and 11 differs from that which is described solely in that the special added fly-wheel ring is omitted, the bulk of the annular, radially extending flange 87 being relied on to provide the desired compensating fly-wheel action. Accordingly, all corresponding parts bear corresponding reference numerals, the D-shaped driving and driven openings of the washers 90 being designated 93 as shown in Fig. 11.

Figure 12:
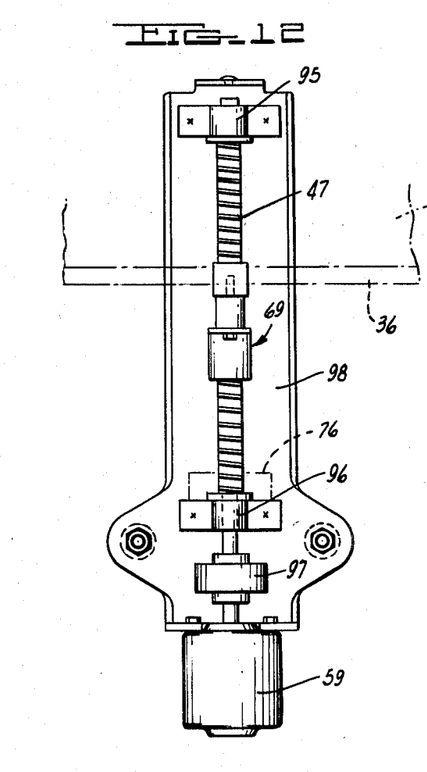
Fig. 12 is a fragmentary view in front elevation of a still further modified type of mechanism incorporating a variation in regard to the mounting provisions therefor.
Figure 13:
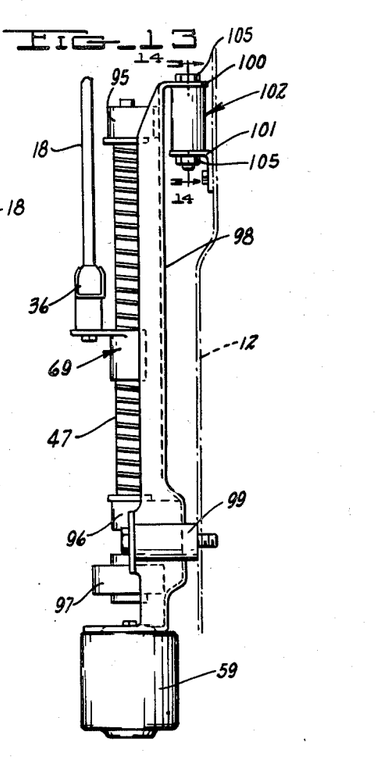
Fig. 13 is a view in side elevation of the mechanism of Fig. 12.
Figure 14:
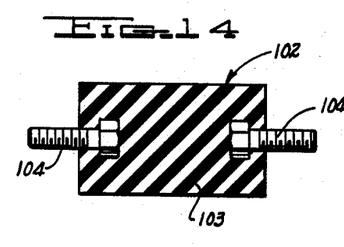
Fig. 14 is a view of an improved mounting element of the structure of Figs. 12 and 13, being in section through that element on line 14—14 of Fig. 13.

A further modified form of the invention is shown in Figs. 12, 13, and 14 of the drawings, which deal in their details primarily with an improvement in a mounting for the upper end of the operating screw 47. Here, the screw 47 is appropriately journaled in upper and lower bearings 95, 96, being connected at its lower end through a resilient coupling 97 to the motor 59 in a suitable manner, or as illustrated and described in connection with Figs. 2–11. An upwardly extending mounting frame 98 of mildly channel outline is secured on the frame or like part 12 by means of block-type spacer connections 99 adjacent the bottom of the mounting frame 98. At its upper end, the frame 98 has a horizontal offset flange 100 which, as operatively positioned and mounted, is located in vertically spaced relation above a flanged bracket 101 secured to the part 12. The space between the flange 100 and a horizontal flange of the bracket 101 is bridged by a cushioned connector 102 of the type shown in Fig. 14. It comprises a block of rubber 103 which has moulded therein the enlarged heads of a pair of oppositely extending screw elements 104, these screw elements being received in suitable apertures in the flange 100 and bracket 101, and receiving nuts 105 to hold the parts in assembly.

Figures 15, 16:
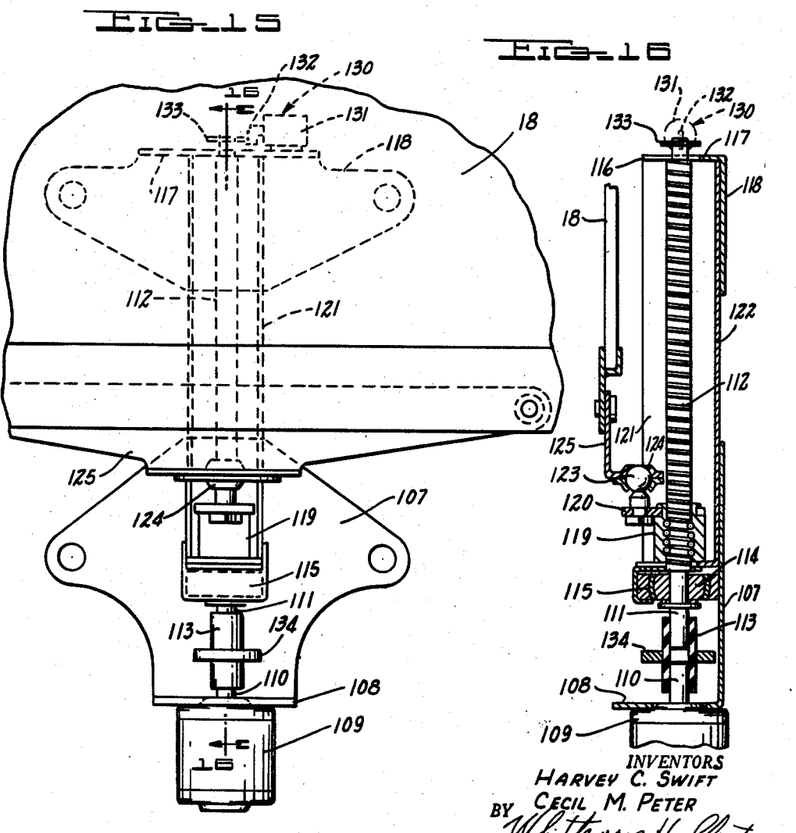
Fig. 15 is a fragmentary elevational view of a modified form of window regulating mechanism incorporating a direct motor drive.
Fig. 16 is a vertical sectional view along line 16—16 of Fig. 15.

Referring now to Figs. 15 and 16 there is illustrated another embodiment of the present invention comprising a bracket 107 having a horizontally extending plate 108 to the underside of which is secured a motor 109. The motor includes a drive shaft 110 adapted to be coupled to the reduced end 111 of a screw 112 by a flexible coupling sleeve 113. In this case the screw 112 is mounted for limited universal angular adjustment about a point adjacent its lower end by a ball portion adjacent its lower end by a ball portion 114 carried by the shaft received within a ball socket element 115 carried by the bracket 107. The upper end of the shaft screw 112 is received in an opening 116 in a horizontally extending portion 117 of a bracket 118. Mounted for vertical movement on the screw 112 is a ball nut 119 having a bracket 120 secured thereto which fits between the side walls 121 of a channel member 122 and thus prevents rotation of the nut 119 while permitting substantially free vertical movement thereof. The bracket carries a ball 123 received in a ball socket 124 carried by a bracket 125 connected to the lower channel member of the frame of the window 18. The ball and socket connection at the lower end of the screw permits the screw to adjust itself into parallelism with the movement of the window tending to prevent binding.

As illustrated in Figs. 15 and 16, the invention contemplates the provision of means to prevent lowering or opening of the window 18 other than by operation of its screw and nut operator structure. While an arrangement such as is shown in Fig. 1, involving an irreversible worm and worm wheel driving source, will not actually require special locking means of this sort, it will be appreciated that in the case of a direct drive connection through a flexible coupling as in the embodiments of Figs. 3, 6, 8, 9, 10, 13 and 16, a special locking mechanism is highly desirable.

Accordingly, as shown in Figs. 14 and 15, there is mounted on the flange portion 117 of the bracket 118 a locking device 130 which may comprise a solenoid 131 having a movable plunger therein carrying a blade 132 receivable in notches in a disk 133 secured to the upper end of the screw 112. The very limited range of bodily movement of the upper screw end is not sufficient to prevent such engagement. The solenoid 131 may be wired so that when the motor 109 is energized the solenoid is also energized in a direction to retract the blade 132 and thereby permit rotation of the screw 112. However, when the motor is de-energized, appropriate means (not shown) associated with the solenoid, such as a spring, will advance the blade 132 into engagement in a notch in the disk 133 and thereby lock the screw member against rotation.

The purpose of the above mentioned device is to insure that the window may not be forced downwardly when the motor is de-energized. This permits leaving the window slightly open in parking lots, for example, and will prevent an unauthorized person from forcing the window downwardly by forces applied directly to the top of the window. It will be observed that due to the use of means such as a spring for urging the locking device into operation, the window will be locked in the event of power failure or the like. Moreover, if the motor fails while the source of power is still available, closure of the switch normally energizing the motor and solenoid will have the effect of retracting the blade 132 from the notched disc 133 and thereby permit manual raising and lowering of the window.

If desired, the locking device 130 and the notched disc 133 may have a ratchet type construction so that it will prevent rotation of the screw in one direction only. In this case the parts will be arranged so that the locking device is effective to prevent lowering of the window by forces applied directly thereto but will not prevent manual raising of the window in the event of power failure.

It will be appreciated that the locking device comprising the solenoid 131, blade 132, and the notched disc 133 may be provided with any of the illustrated embodiments of the invention and it is illustrated in conjunction with Figs. 14 and 15 only as a matter of convenience and is not repeated in the remaining figures or description. It is further appreciated that where the transmission of power from the motor to the rotatable element of the screw and nut combination is through a worm and worm gear, the solenoid type locking device will not normally be required, since the worm and worm gear ordinarily constitutes a locking device without other mechanism. In other words, the particular locking device illustrated finds its greatest utility in the embodiments of the invention in which the motor drives the rotatable element of the screw and nut combination directly or at least through means which do not include an irreversible driving device such as a worm and worm gear. A flywheel ring 134 may be bonded to the coupling sleeve 113.

Reference should be made to Figs. 17 through 21 and Fig. 22 for details of an improved screw unit which is contemplated for use in any of the various adaptations of the invention described above, preferably in conjunction with a ball nut unit as also described.

In accordance with one embodiment illustrated in Figs. 17–21, a screw 135 is provided in the form of an elongated piece of steel tubing which has a helical thread 136 rolled thereon through a substantial portion of its length intermediate the ends of the tube. One end of the thus rolled section is swedged radially inwardly to provide a bearing diameter at 137, while a similar, radially restricted bearing portion 138 is formed immediately outwardly of the thread 136 at the opposite end of the latter. Bearing portion 138 is in turn adjoined immediately outwardly by a section 139 which is swedged in a non-circular cross sectional outline (Fig. 21) at which the screw 135 will be drivingly coupled, as through a suitable flexible coupling herein above referred to, with an actuating motor or the like. The bearing sections 137 may receive thrust washers 140 adjacent the opposite ends of the rolled screw thread 136, which are axially abutted by flanged bushings 141 by which the actual journalling of the screw 135 is performed, for example, as illustrated in Figs. 3, 8 or 13.

Figure 17:
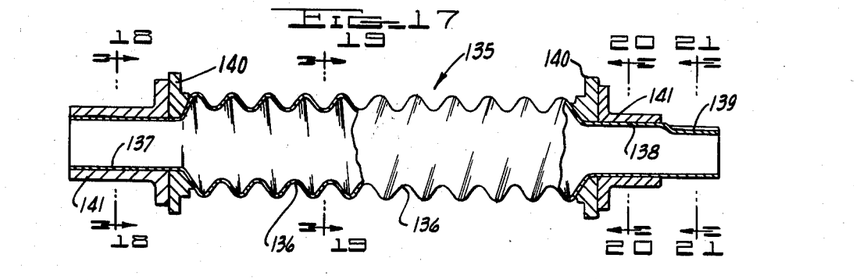
Fig. 17 is a view in axial section illustrating an improved type of rolled tubular screw member contemplated for use in the regulating mechanism; this screw member having associated parts indicated in dotted line.
Figure 18:
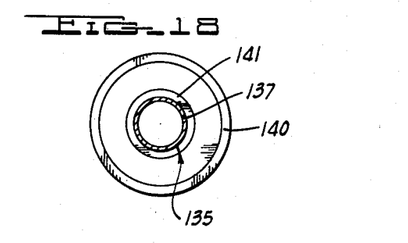
Figs. 18 through 21 are, respectively, views in transverse vertical section along line 18—18, 19—19, 20—20 and 21—21 of Fig. 17.
Figure 19:
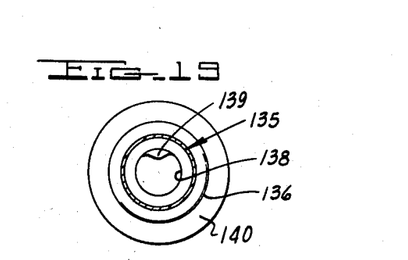
Figure 20:
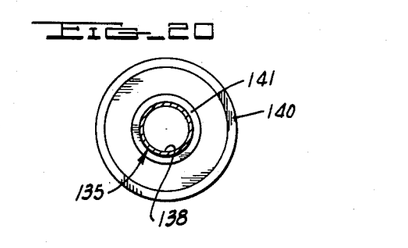
Figure 21:
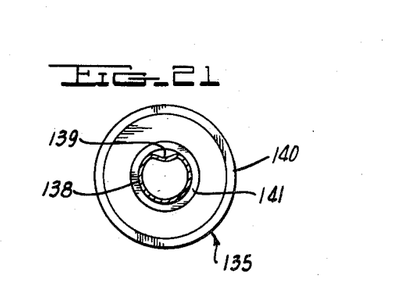

The improvement affords a screw unit of very inexpensive, yet perfectly reliable, character which makes possible a substantial reduction in the cost of each window installation. It will be appreciated that a ball nut unit 34, such as is shown in Fig. 1, will be operatively associated with the improved tubular screw 135, the balls of the unit exiting from the screw adjacent opposite ends thereof in the manner previously described.

Figure 22:
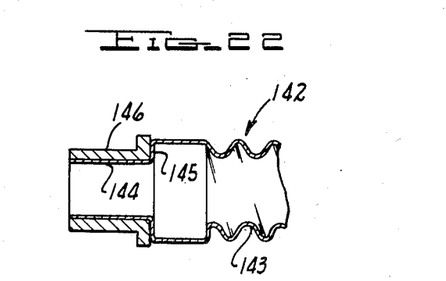
Fig. 22 is a fragmentary view in axial section similar to Fig. 17, illustrating a modification in the tubular screw construction.

A slightly modified form of the screw is illustrated in Fig. 22, being generally designated 142. Here, the screw thread 143 as rolled onto the tube terminates inwardly of the end swedged bearing portion 144, the inward formation 145 in this zone acting as a stop shoulder for the bearing portion 144. It is thus unnecessary to mount a special thrust washer to be abutted by the bushing 146.

Figs. 23 through 26 illustrate a still further modification of the window regulator structure in accordance with the invention, which incorporates all of the advantageous features heretofore discussed in connection with the other embodiments. It employs a pair of constant tension, negator-type tension springs for bearing and balancing the major portion of the weight of the window, thus permitting an off-center location of captive ball and screw actuator for the regulator, if desired, and also making for economy of production in that a smaller size electric motor may be employed to sustain a very minor part of the window weight; it incorporates a resilient torque coupling and inertia compensating device which centrifugally adjusts the center of inertia of the ball nut and rotating screw of the actuator along the unsupported length of screw, resulting in silent operation over a long period of service; and it features improved specific arrangements, including resilient mounts for the end of the screw, a cushioned push-pull connection between the window and the actuator, etc., which take torsional and compressive stresses in an improved way, and also contribute to noiseless operation.

The regulator mechanism 150 of Figs. 23 through 26, comprises an upright frame work composed of a pair of laterally spaced side rails 151, each formed to provide generally parallel upright straps in laterally spaced relation to one another and integrally connected by cross portions 152 at their ends to provide an elongated loop outline of each rail 151. The rail members are secured in rigidly braced relation to one another by a top bearing yoke 153 to which they are welded, and a U-shaped bottom bearing yoke 154, to the side arms 155 to which they are also welded. Such a rail frame is very economically manufactured and is of ample rigidity for the purpose.

Figures 23, 24, 25, 26:
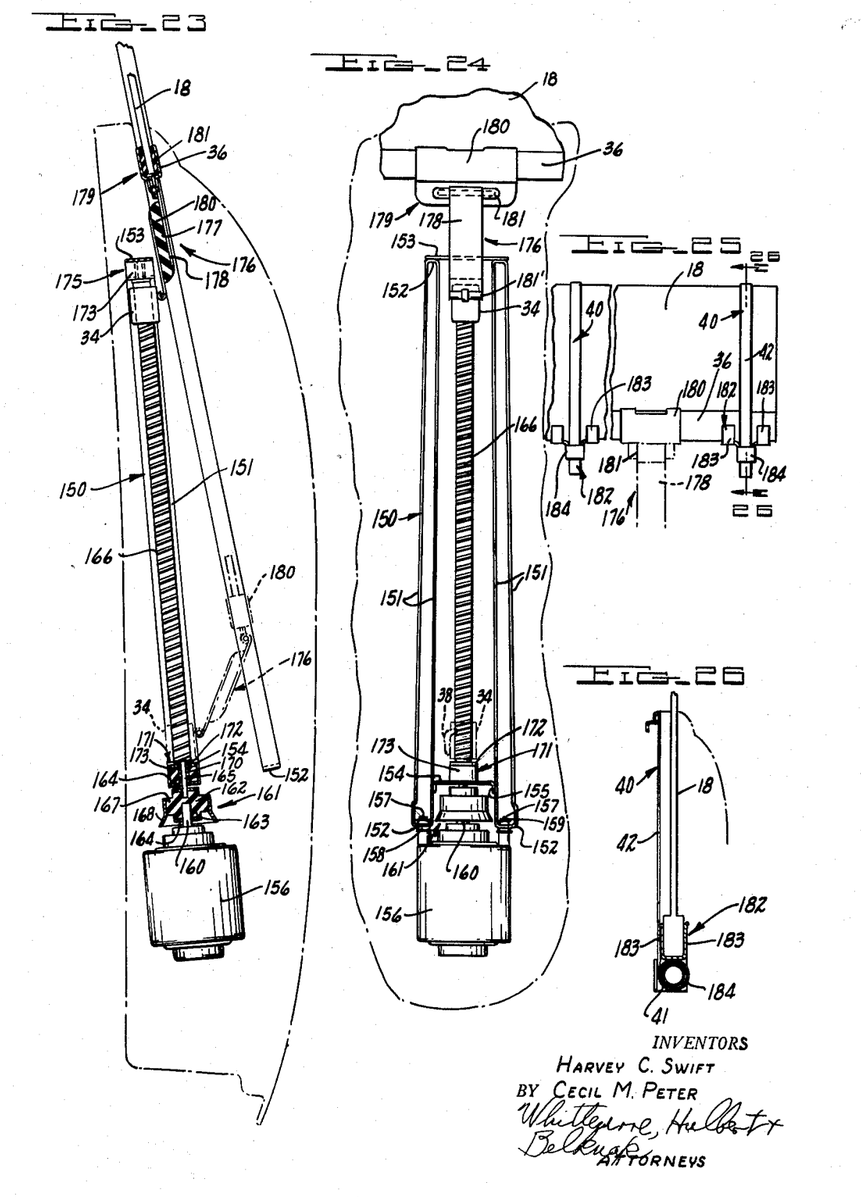
Fig. 23 is a view in vertical section through an automotive door equipped with a window regulating mechanism according to a further modified and improved adaptation.
Fig. 24 is a front elevational view of the regulator of Fig. 23.
Fig. 25 is a fragmentary side elevation of a portion of the regulator and its component torque window lift means.
Fig. 26 is a view in vertical section on line 26—26 of Fig. 25.

An electric motor 156 is supported by the rail members 151 by means of upwardly projecting studs 157 on the motor, which extend through the cross portions 152 of the rails and through rubber cushion grommets 158 carried by those parts. Nuts 159 are threaded onto the stud ends to take up the motor mount and compress the cushioning and silencing grommets 158.

The shaft 160 of motor 156 is drivingly connected to an inertia type resilient coupling 161, details of which are shown in Fig. 23. It includes a rubber-like resilient coupling core or body 162 similar to that shown in Figs. 9 and 10 of the drawings, and the opposite axially extending center portions 163 of coupling 162 have metal washers 164 set therein to receive the driving torque of motor, and to transfer the torque to the reduced lower shaft extremity 165 of the regulator screw 166. The radially flanged portion 167 of coupling 161 has the annular inertia fly-wheel element 168 bonded thereto, which element flanges downwardly and outwardly to serve as a shield for the motor 156, as in certain of the other embodiments.

The lower screw extension 165 is rotatably received in a flanged bushing 170 of a resiliently cushioned mounting member 171, which is carried by the upper surface of the lower bearing yoke 154. The bushing 170 is received in a metal torque disk 172 which is in a non-rotative, inset and bonded relation to the rubber body 173 of the member 171. The cushion body 173 is bonded to yoke 154.

The captive ball nut 34 is threadedly received on screw 166 for vertical travel as the screw is rotated, and the upper end of the screw 166 is rotatably journaled in a cushioned mounting unit 175 similar to the unit 171 and similarly bonded to the bottom of the upper yoke 153. It will be seen that the upper and lower mounting units 171, 175 serve as bumpers or stops to cushion the nut 34 at the ends of its up and down movements.

The window 18 is connected to the nut 34 by means of an improved cushioned push-pull connection, generally designated 176. This connection is made up of a first plate 177 hingedly connected by an eye to an extension to the ball nut 34, a second similar plate 178 similarly hinged to a window frame clip 179 of improved type, and a rubber cushion pad 180 bonded on its opposite sides to the plates 177, 178. Raising and lowering force exerted on the window is transmitted in tension or shear through the pad 180, enabling the window to be snugly seated in its frame despite possible minor obstructions, and insuring noiseless functioning at the connection 176.

The clip 179 is a snap-on element of spring steel including an upper U-shaped clip jaw 181, which snaps over the window cross member 36, hooking over its upper edge, and an eye element 181' integral with the jaw 181, to which the connection 176 is pinned. The two constant tension, negator-type springs 40 are applied to the window member 36 by means of a pair of improved snap-on spring journaling clips 182. These are fabricated of spring steel, and each include laterally spaced forked arms 183 frictionally engaging cross member 36 under compression, as well as a box-type integral mount 184 between the arms, in which the tape roll 41 of the constant tension spring 40 is journaled.

As in the previously described embodiments, the ball nut 34 represents a constantly changing mass in its vertical travel along screw 166, the inertia of which is balanced automatically and cancelled out in all phases by small changes in the radial position of the inertia coupling 161, seeking its own center of rotation. Lacking the inertia device, the substantial unsupported length of the screw 166 would be subject to a decided radial whip in action, with destructive effect on the mechanism, to say nothing of noisiness which would not insure owner approval. The inertia fly-wheel 168 automatically adjusts the center of inertia of the nut-screw assembly as a whole.

The screw has no critical speed within the limitations of its resilient mounts at 171 and 175. The nut 34 carries little or no load, most of which is assumed and properly balanced by the springs 40. Being thus rendered, in effect, a free agent in its inertia response to the rotation of screw 166, the independently supported nut and screw unit requires the balancing action of fly-wheel 168 to eliminate noise and vibration stresses.

The constant tension springs 40 (a) permit the off-center location of the screw and ball nut assembly in relation to the window cross member 36; (b) remove practically all load from the screw, permitting the same to operate as a true regulator, rather than a combined regulator and load support, and reducing size of the electric motor 156 required; (c) hold the window 18 more firmly in relation to the window channels in which it slides, which is extremely important in convertible type automobiles in which the amount and length of available window guide channel is greatly reduced; and (d) enable the ball nut and screw unit to be positioned off-center of the window as desired, to one side or the other, in order to insure that the window will follow snugly in an adjacent channel. In short, the assembly of the ball nut and screw unit and the two constant tension springs 40 is one which positions the window automatically through the springs as desired. Thus only sufficient power is required to be applied to the screw to overcome friction (the screw being about 97 percent efficient), plus a break-away force to overcome sticking of the window in action, due to freezing or jamming.

It is highly desirable that the ball nut and screw unit need not be exactly centered in respect to the window 18, especially when the weight of the window is unbalanced in relation to its center. An unbalanced window produces undue strain and stress on the fabric usually employed in the channel, causing binding and undue wear. However, in accordance with the invention, regulating and weight balancing force can be applied to the window at any point between the two springs 40, which have the primary function of lifting and lowering the window.

It is to be noted particularly, in reference to Figs 23 through 26, that resilient mounting means are employed throughout the structure, where practical. The units 171, 175 mounting the screw 166 are placed in tension or torsion under the rotative actuation of the screw. The connection 176 between ball nut 34 and the window 18 is unique, in that here also the rubber cushion 180 is loaded in tension or shear as it drives the window one way or the other. Similarly, contact of metal to metal parts has been largely eliminated, as in the mounting of the motor 156 on the rail structure 151.

Details such as the specific mountings of the screw and nut elements, the window connections, the constant force springs, etc., which are illustrated in one embodiment of the invention may be incorporated in a structure representing another embodiment of the invention. It will be understood that in order to illustrate every possible combination of the several details of the construction included in the several embodiments of the invention would require a prohibitive number of figures to the drawings.

It is also desired to emphasize that the present invention extends to four possible combinations of screw and ball nut; namely, the condition in which the screw is rotated and the nut fed vertically, the condition when the nut is rotated and the screw fed vertically, the condition when the nut is fixed and the screw is both rotated and fed vertically, and the condition in which the screw is fixed and the nut is both rotated and fed vertically.

The drawings and the foregoing specification constitute a description of the improved window lift mechanism in such full, clear, concise and exact terms as to enable any person skilled in the art to practice the invention, the scope of which is indicated by the appended claims.

What we claim as our invention is:

1. The improvement in a screw and nut type power transmission mechanism for regulating the reversing movements of a window or like moving member relative to a frame or like structure, which mechanism is characterized by an elongated screw element having a nut element in relatively rotatable and axially shiftable, threaded engagement therewith, one element of the pair being mounted on and movable with said member and the other being mounted on said structure, said improvement comprising the combination of a compensated anti-vibratory flexible connection to couple the rotative element for drive by a rotative motor driven actuator, and a constant torque type biasing device connected between said member and structure to assist movement of the former along the latter in one direction, said device comprising a coiled tape unit acting under torsion and operatively connected at one end thereof to said member and at the other end thereof to said structure to bias the member in one direction along the structure, under control of said rotative actuator, said anti-vibratory flexible connection comprising an angularly yieldable member adapted to be disposed coaxially of said screw element and having means to drivingly connect the same to the rotative element of said first named pair and to said actuator device, said yieldable member acting to produce a substantially uniform centrifugal action having a gyratory effect in compensating said elongated screw element against radial whip in any relative axial position of the nut and screw elements and in either direction of their relative axial movement.

2. The improvement in a screw and nut type power transmission mechanism for regulating the reversing movements of a window or like moving member relative to a frame or like structure, which mechanism is characterized by an elongated screw element having a nut element in relatively rotatable and axially shiftable, threaded engagement therewith, one element of the pair being on and movable with said member and the other being mounted on said structure, said improvement comprising the combination of a compensated anti-vibratory flexible connection to couple the rotative element for drive by a rotative motor driven actuator, and a constant torque type biasing device connected between said member and structure to assist movement of the former along the latter in one direction, said device comprising a pair of tape-like members coiled under torsion and operatively connected at one end thereof to said member and at the other end thereof to said structure to bias the member in one direction along the structure, under control of said rotative actuator, said coiled members being connected to said member and structure on opposite sides of the mount thereto of said screw and nut elements, said anti-vibratory flexible connection comprising an angularly yieldable member adapted to be disposed coaxially of said screw element and having means to drivingly connect the same to the rotative element of said first named pair and to said actuator device, said yieldable member acting to produce a substantially uniform centrifugal action having a gyratory effect in compensating said elongated screw element against radial whip in any relative axial position of the nut and screw elements and in either direction of their relative axial movement.

3. The improvement in a screw and nut type power transmission mechanism for regulating the reversing movements of a window or like moving member relative to a frame or like structure, which mechanism is characterized by an elongated screw element having a nut element in relatively rotatable and axially shiftable, threaded engagement therewith, one element of the pair being mounted on and movable with said member and the other being mounted on said structure, said improvement comprising the combination of a compensated anti-vibratory flexible connection to couple the rotative element for drive by a rotative motor driven actuator, and a constant torque type biasing device connected between said member and structure to assist movement of the former along the latter in one direction, said device comprising a pair of tape-like members coiled under torsion and operatively connected at one end thereof to said member and at the other end thereof to said structure to bias the member in one direction along the structure, under control of said rotative actuator, said coiled members being connected to said member and structure on opposite sides of the mount thereto of said screw and nut elements, said anti-vibratory flexible connection comprising an angularly yieldable member adapted to be disposed coaxially of said screw element and having means to drivingly connect the same to the rotative element of said first named pair and to said actuator device, and inertia means rotatable with said yieldable member and rotative element to produce an additional and substantially uniform centrifugal action, other than that of said last named member and element, having a gyratory effect in compensating said elongated screw element against radial whip in any relative axial position of the nut and screw elements and in either direction of their relative axial movement.

4. The improvement in accordance with claim 1, in which the element movable with said moving member has a flexible connection to the latter for such movement.

5. The improvement in accordance with claim 1, in which the element movable with said moving member has a flexible connection to the latter for such movement, including an element of resilient material secured in lateral offset relation thereto and having means securing the same to said moving member.

6. The improvement in accordance with claim 1, in which said nut element is a low friction, captive ball type having means mounting the same to move with said moving member.

7. The improvement in accordance with claim 1, in which said nut element is a low friction, captive ball type having means mounting the same to move with said moving member and having a flexible connection to the latter for such movement.

8. The improvement in accordance with claim 1, in which said nut element is a low friction, captive ball type having means mounting the same to move with said moving member and having a flexible connection to the latter for such movement, including an element of resilient material secured in lateral offset relation thereto and having means securing the same to said moving member.

9. The improvement in accordance with claim 1, in which the element movable with said moving member has a flexible connection to the latter for such movement, including plate elements respectively hinged to said movable element and movable member and a resilient cushion member bonded to said plate elements.

10. The improvement in accordance with claim 1, in which the element movable with said moving member has a flexible connection to the latter for such movement, including plate elements respectively hinged to said movable element and movable member and a resilient cushion member bonded to said plate elements between the same.

11. The improvement in accordance with claim 1, in which said anti-vibratory flexible connection includes non-resilient means carried by said angularly yieldable member for rotation therewith to increase said compensating gyratory effect.

12. The improvement in accordance with claim 1, in which said anti-vibratory flexible connection includes non-resilient means carried by said angularly yieldable member for rotation therewith to increase said compensating gyratory effect, including a radially outwardly extending annular portion to shield said actuator device.

13. The improvement in accordance with claim 1, in which said anti-vibratory flexible connection includes non-resilient means carried by said angularly yieldable member for rotation therewith to increase said compensating gyratory effect, said last named means comprising a ring circumferentially surrounding said angularly yieldable member.

14. The improvement in accordance with claim 1, in which said anti-vibratory flexible connection includes non-resilient means carried by said angularly yieldable member for rotation therewith to increase said compensating gyratory effect, said last named means comprising a pair of discs fixed on said angularly yieldable member on opposite sides thereof and having means to drivingly connect the same respectively to the rotative element of said first named pair and to said actuator device.

15. The improvement in accordance with claim 1, in which said angularly yieldable member includes a resilient block having rigid, coaxial connector elements extending from opposite ends thereof for connection to the rotative element of said first named pair and to said actuator device.

References Cited in the file of this patent
UNITED STATES PATENTS

| | | |
|---|---|---|
| 2,092,919 | Johnson | Sept. 14, 1937 |
| 2,311,972 | Simpson | Feb. 23, 1943 |
| 2,337,867 | Brotman et al. | Dec. 28, 1943 |
| 2,361,529 | Briggs | Oct. 31, 1944 |
| 2,528,396 | Steins | Oct. 31, 1950 |
| 2,543,100 | Engh | Feb. 27, 1951 |
| 2,560,179 | Lermont et al. | July 10, 1951 |
| 2,657,925 | Crow | Nov. 3, 1953 |
| 2,660,029 | Geyer | Nov. 24, 1953 |
| 2,664,002 | Anderson | Dec. 29, 1953 |
| 2,731,261 | Drum | Jan. 17, 1956 |
| 2,768,532 | Russell | Oct. 30, 1956 |
| 2,778,239 | Hoover | Jan. 22, 1957 |